United States Patent [19]

Cox et al.

[11] Patent Number: 5,014,347
[45] Date of Patent: May 7, 1991

[54] FIELD TELEPHONE SYSTEM

[75] Inventors: Edwin G. Cox, Jamestown; David T. Ritter, High Point, both of N.C.

[73] Assignee: Gulton Industries Inc., Femco Division, High Point, N.C.

[21] Appl. No.: 336,247

[22] Filed: Apr. 11, 1989

Related U.S. Application Data

[62] Division of Ser. No. 157,051, Feb. 16, 1988, Pat. No. 4,847,888.

[51] Int. Cl.⁵ .......................... H04B 1/02; H04B 1/40
[52] U.S. Cl. ...................................... 455/110; 455/75; 455/119; 455/114
[58] Field of Search .................. 455/76, 75, 86, 87, 455/103, 104, 105, 119, 114, 110, 113

[56] References Cited

U.S. PATENT DOCUMENTS

| 3,175,170 | 3/1965 | Duyne | 455/114 |
| 3,706,039 | 12/1972 | Bott | 455/119 |
| 3,838,355 | 9/1974 | Papaieck | 455/119 |
| 4,610,030 | 9/1986 | Dominguez et al. | 455/119 |

Primary Examiner—Benedict V. Safourek
Assistant Examiner—Ralph Smith
Attorney, Agent, or Firm—Darby & Darby

[57] ABSTRACT

A field telephone system having a widely dispersed set of telephone lines including a page line pair and a party line pair, audio processing equipment including telephone handsets, handset amplifiers, receiver amplifiers and paging speaker amplifiers is designed to have improved voice transmission by provision of a narrow band FM carrier system. The FM carrier system includes a device for generating a carrier frequency signal, a modulator for modulating the carrier frequency with an audio signal derived from one of the handsets at a transmitting station and circuitry for transmitting the modulated signal over a line pair to a receiving station. The receiving station includes circuitry responsive to the transmitted signal and the carrier frequency signal for extracting the audio component of the transmitted signal and for processing the extracted audio signal and for providing the processed audio signal to a handset at the receiving station. A frequency mixing arrangement is utilized to provide a low distortion carrier signal since the system otherwise prevents the use of ordinary filtering techniques.

19 Claims, 7 Drawing Sheets

FM TRANSMITTER 21

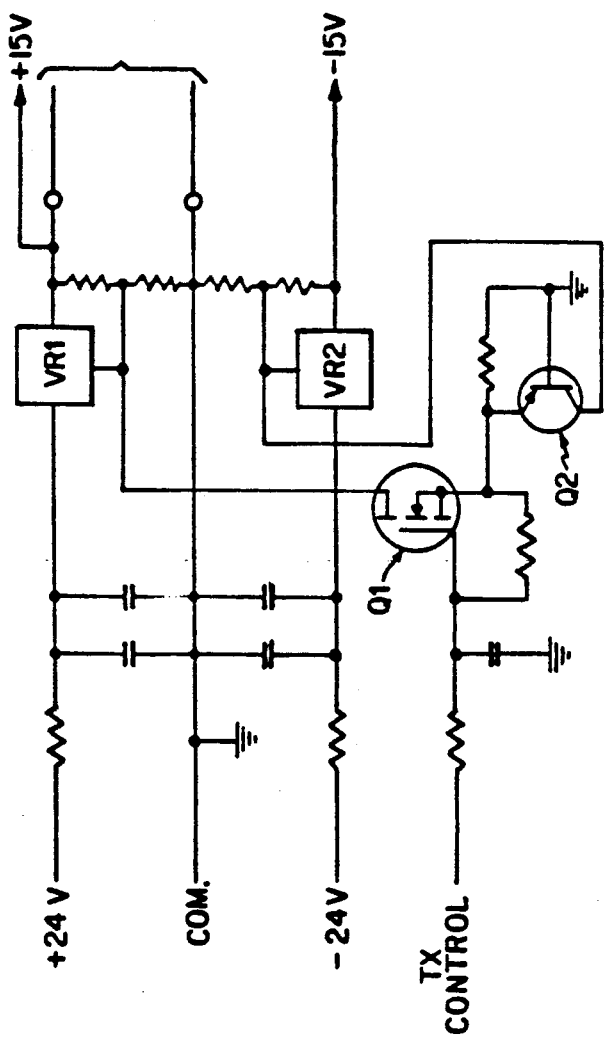
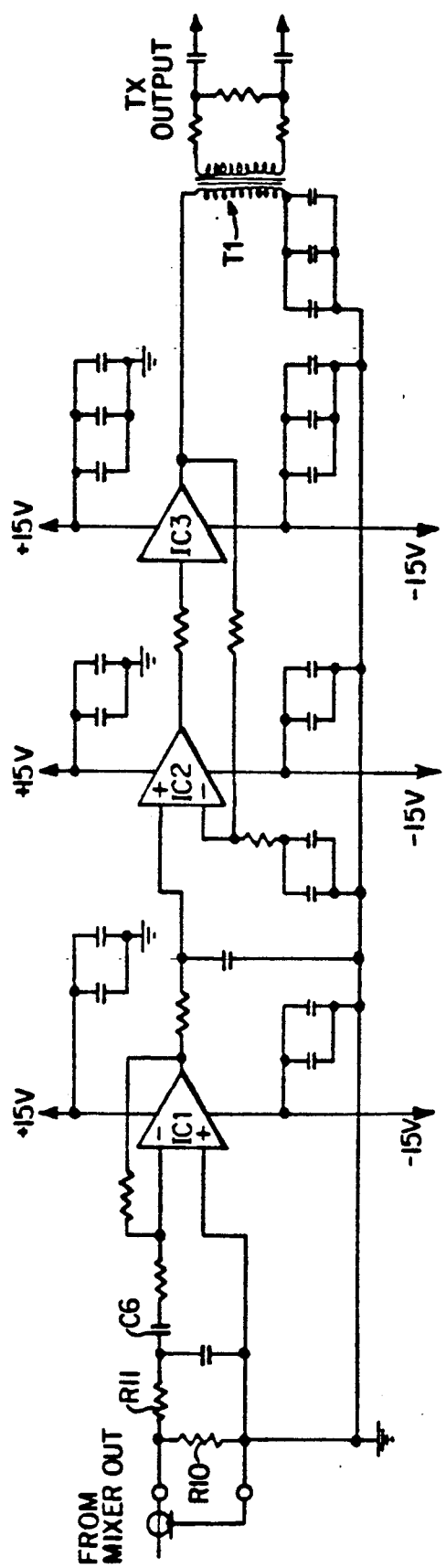
FIG. 5A
FIG. 5B

FIELD TELEPHONE SYSTEM

This is a division of application Ser. No. 157,051, filed Feb. 16, 1988 now U.S. Pat. No. 4,847,888.

FIELD OF THE INVENTION

The present invention relates to a dedicated field party line telephone page party or intercom systems and, in particular, such dedicated systems which employ carrier techniques for transmitting and receiving.

NOTE: In this application the terms telephone and telephone system are used to describe an intraplant voice communications system. It has no relationship nor connection to the subscriber loop public service utility telephone in use in homes and offices.

BACKGROUND OF THE PRIOR ART

In field use, such as in electric generating plant, it is desired that numerous telephone handset stations communicate with one another. Such systems typically employ a page line and a party line for station to station communications. Many older systems employ audio techniques for such communications which give rise to various problems. These problems include excessive noise, signal fade and general lack of clarity of the voice after signal transmission plus overcrowding. A major limitation of such prior systems is their inability to handle more than one conversation at a time.

A particular aim of the present invention is to provide an improved and expanded telephone communication system for a field installation which utilizes existing field wiring and enclosures.

OBJECTS OF THE PRESENT INVENTION

A principal object of the present invention is to provide improved and expanded communication over existing wires in a field installation using carrier frequency techniques.

Another object of the present invention is to provide multiple simultaneous conversations over existing wiring in a field installation by the use of a multiplicity of narrow band FM channels.

A further object of the present invention is to provide improved telephone communication over wiring which exhibits significant attenuation a potential carrier frequencies, such as frequencies in the range of 50 KHZ to 400 KHZ.

Another object is to improved telephone communication system which is completely compatible and coexists with existing stations so that both types of units can be completely operational on the same field wiring.

Another object of this invention is that components of the system embodying the invention be plug-in interchangeable with existing units.

A still further object of the present invention is the provision of a telephone system using carrier techniques which allows any telephone unit in the system to be switched to any of the pre-assigned channels, which channels have a frequency anywhere in the frequency range of the system.

Yet another object of the present invention is the provision of a telephone system using an FM carrier which employs filtering techniques by use of frequency mixing for providing a low distortion system transmitter signal under conditions where ordinary filtering techniques are not feasible.

SUMMARY OF THE PRESENT INVENTION

In accordance with the present invention, in a field telephone system having a widely dispersed set of telephone lines including a page line pair and a party line pair, audio processing equipment including telephone handsets, handset amplifiers, receiver amplifiers and paging speaker amplifiers, the improvement comprising a narrow band FM carrier system for voice communication over one pair of the lines. The FM carrier system includes means for generating a carrier frequency signal and means for modulating the carrier frequency with an audio signal derived from one of the handsets and respective handset amplifiers at a transmitting station. Means are also included for transmitting the modulated signal over the line pair to a receiving station. The receiving station includes means responsive to the transmitted signal and the carrier frequency signal for extracting the audio component of the transmitted signal and for processing the extracted audio signal and for providing the processed audio signal to a handset at the receiving station.

For a better understanding of the present invention, reference is made to the following description and accompanying drawings, while the scope of the present invention will be pointed out in the appended claims.

BRIEF DESCRIPTION OF THE DRAWINGS

In the drawings:

FIGS. 5A and 5B are schematic diagrams of the amplifier portion of the transmitter and the control for activating and deactivating the transmitter;

DESCRIPTION OF THE PREFERRED EMBODIMENTS

Figure 1:
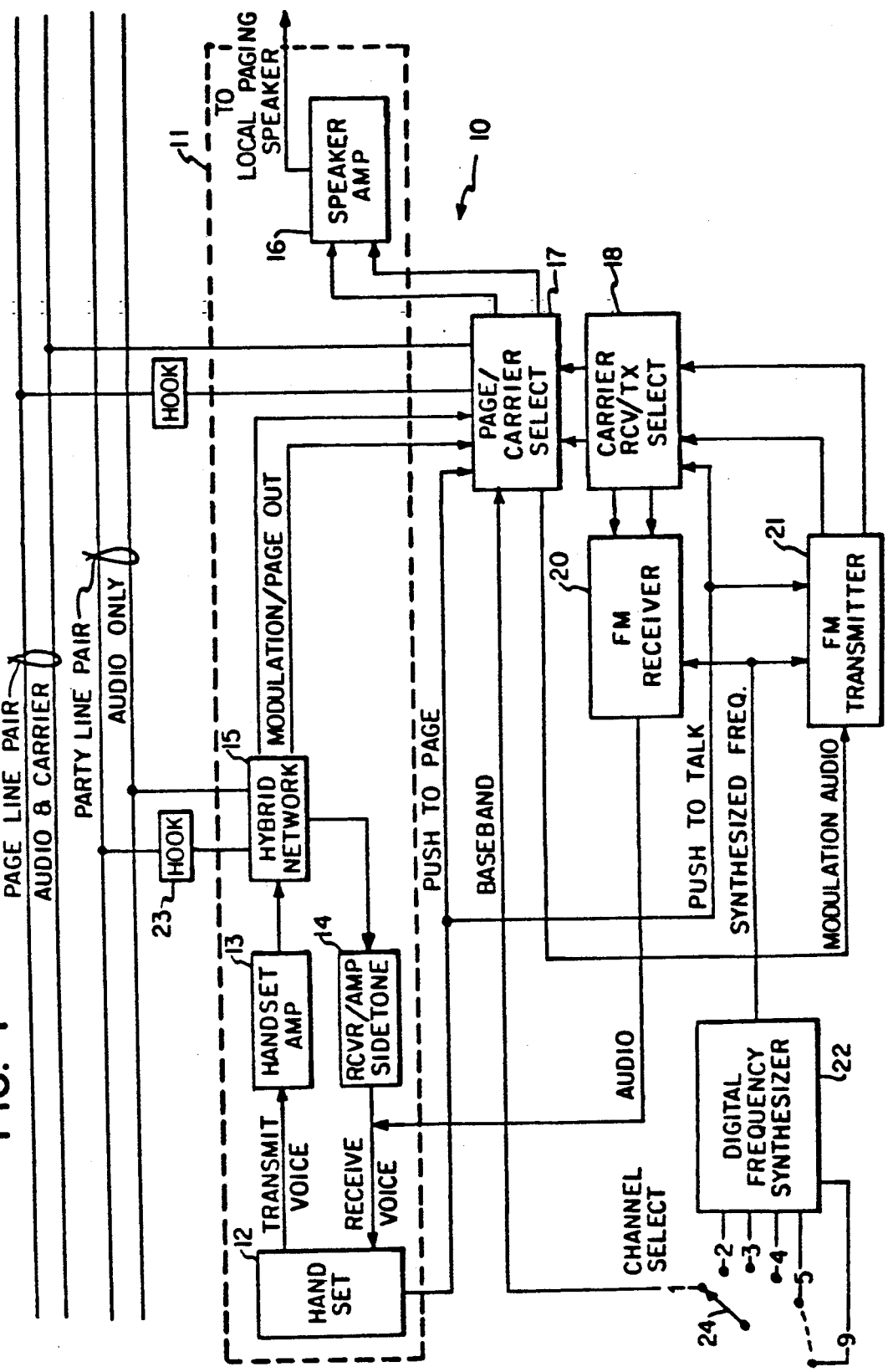
FIG. 1 illustrates an overall electrical block diagram of the field telephone system of the present invention.

Referring to FIG. 1, a system (10) for field communication in accordance with the present invention is illustrated. The system (10) includes a portion which is typically related to original wiring and employs audio circuitry as would be used, for example, in an electric generating plant installation. This portion includes a handset (12), a handset amplifier (13), a receiver amplifier (14), a hybrid network (15) and a speaker amplifier (16). The original circuitry is shown by a dash line and is indicated as element (11).

Added to the original system are means for providing narrow band FM carrier signal transmission which includes a digital frequency synthesizer (22) activated by one of the channel select inputs, an FM transmitter (21), an FM receiver (20), a carrier receive/transmit select block (18) and a page/carrier select block (17).

Figure 2:
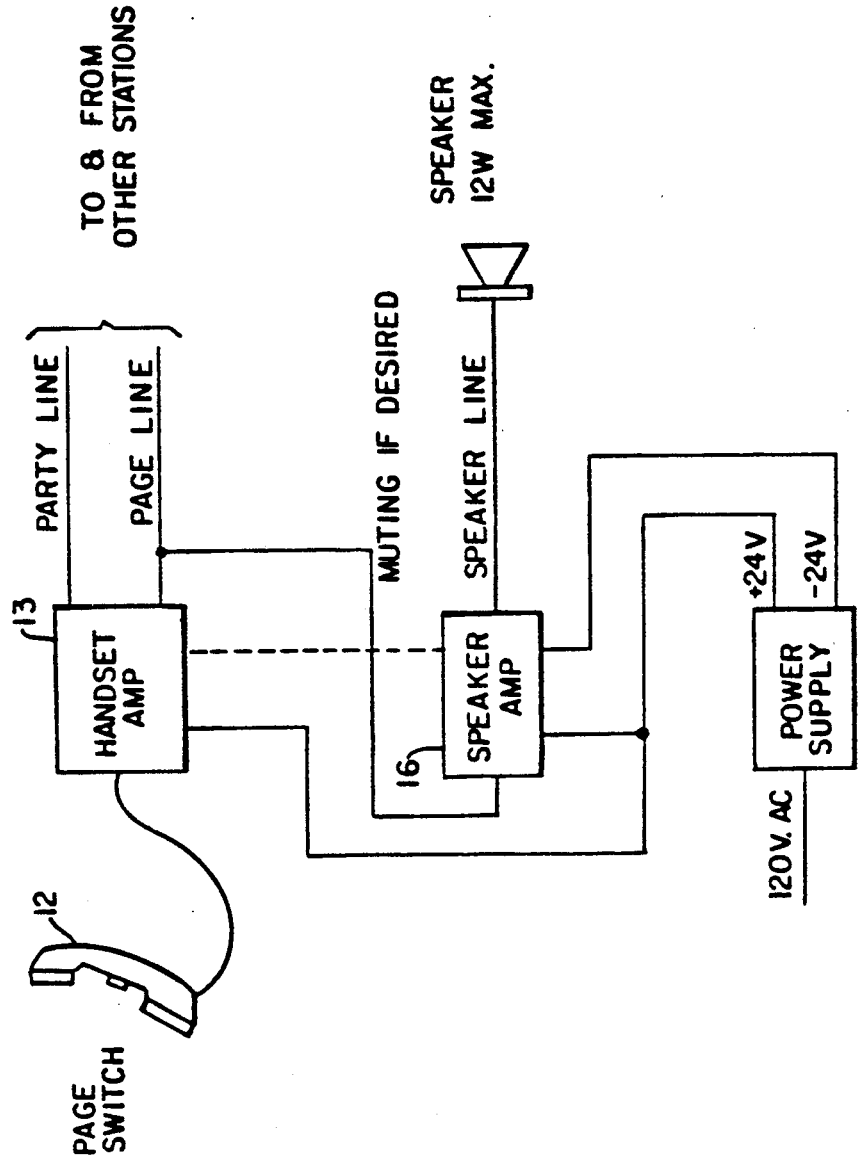
FIG. 2 is a block diagram of a handset and speaker amplifiers and related inputs and outputs of the system of FIG. 1.

In order to appreciate the function of the individual blocks, it is important to understand, in general, how the system is used. The system is intended to operate by having a caller "page" the person he intends to speak to over the "page" line and then having the caller and the person paged switch to one of several "carrier" channels for conversing. The page is initiated by placing a multi-position (shown here as a 5 position) switch in position 1. This puts the system in baseband operation. By "baseband operation" it is meant that the system is operating in a voice mode with no carrier active, using only the original audio circuitry. The handset (12) is then lifted, which closes hook switch (23), and the "page" button (switch) in the handset (see FIG. 2) is then pressed.

The voice signal that originates in the handset is sent through the handset amplifier (13), the hybrid network (15) (which operates as a directional coupler to provide a known predictable impedance), the page/select block (17) and onto the page line pair. As mentioned above, the person paged then is instructed to switch to a particular channel (2, 3, 4, 5 etc.) so that both parties can converse. In these channels, carrier circuitry is utilized to provide improved voice quality transmission, and conversation is carried by a low frequency narrow band FM carrier. By having the parties select the same channel number, the same carrier frequency is chosen.

Frequency selection of the carrier is made by inserting a predetermined 8-bit binary code on four or more 8-bit programmable switches which are connected to the programming inputs of the digital frequency synthesizer (22). The switch (24) which selects one of these programmable codes may be of the rotary type or may be of the pushbutton type. A display, e.g. liquid crystal or the like, may also be used to indicate the selected channel.

In communicating over the selected channel, a switch on the handset is utilized by the person speaking in order to have his/her voice transmitted. This "push to talk" feature is comparable to that used in CB or other two-way radio transmission. By appropriate switching, the same button used to actuate the "page" on the handset may be used for the "push to talk" switch. The "push to talk" activation turns on the regulators for the FM carrier transmitter and activates the carrier RCV/TX select (18) to be in the transmit mode. When the "push to talk" button is not pushed, the circuitry is in the receive mode (as controlled by carrier RCV/TX select [18]).

The carrier communication path, when transmitting, commences by an audio signal from the handset (12) flowing through handset amplifer (13), through hybrid network (15) and through page/carrier select (17). The audio signal is then directed to FM transmitter (21) where it frequency modulates the carrier (which is generated in a manner to be discussed below) and transmitted via carrier RCV/TX select (18) and page/carrier select (17) over a line pair to the receiving station. It should be noted that the modulated carrier is indicated as being sent over the "page line pair". This line was selected in a particular plant location as being less "noisy" than the "party line pair" previously used for "audio only" transmissions.

The audio modulated carrier receiving path is directed along the same line pair ("page line pair") in FIG. 1 to the page/carrier select (17) to carrier RCV/TX select (18) which, during receiving, directs the audio modulated carrier signal to the FM receiver, which includes mixing circuits to extract the audio signal which is then applied to the receiver handset (12).

A key aspect of the present invention is the arrangement for the provision of a pure carrier signal, a carrier signal consisting of only the fundamental frequency, component and being devoid of harmonic components, as a base signal for modulation by FM transmitter (21). There are two significant reasons for the need for a pure carrier signal. First, it was found that the wiring in place (which was designed to handle only voice frequencies) exhibited significant attenuation at carrier frequencies in the range of 50 KHZ to 400 KHZ. Further, the wiring would be virtually useless at 1 MHZ and above for more than a few hundred feet. Since it was desired to use several carrier channels, all had to be crowded into the usable 50 KHZ to 400 KHZ frequency space. Harmonics of the carrier signal (integer multiples thereof) for channels near the low end of the range would appear at frequencies well below the top of the range where other channel assignments are possible. These harmonics represent a spurious signal to the lower frequency carrier signals, and would be detected and processed by the receiver and would be heard as noise.

Any unit in the system, moreover, had to have the capability of being switched to any of the pre-assigned channels, which could be anywhere in the frequency range (a characteristic known as frequency agility). Consequently there was no possibility of frequency isolating the individual units or handsets.

The second reason for the requirement for a pure carrier signal is that in a practical installation having several units distributed over the plant wiring, the large attenuation of the wiring at certain frequencies will mean that large variation in signal amplitudes will exist at any specific point in the system. This places a requirement on the system that the receiver must have a wide dynamic range (i.e., one that will receive a very small signal in an environment infested with large signals and process the small signal without error or distortion). The highly sensitive receiver, however, would also process and amplify small undesirable signals that emanate from an impure transmitter.

In more conventional RF communication systems, the relationships between the individual channel frequencies, their harmonics and the operating frequency range are such that filters can be employed in the transmitter to remove the harmonics and hence diminish their harmful effects on overall system performance. In the present arrangement, filters are not practical because filters which would effectively suppress the harmonics or a carrier frequency at the low end of the range would have unacceptable attenuation to a frequency near the upper end of the range.

The invention derives the pure carrier signal primarily by use of a frequency mixing approach. Two high frequency signal sources are generated, one (f1) by a digital frequency synthesizer (22), and the other (f2) by a reference crystal oscillator forming part of FM transmitter (21). Each signal is filtered to remove objectionable harmonic content. These filtered signals are combined through the use of an analog mixer (to be described further below) to produce a difference in frequency. The amplitudes of these two signals are set by design so that the mixer output signal has an extremely low harmonic content as well as third order intermodulation products and is, therefore, quite pure. The mixer output contains only four frequency components of any significantly measurable amplitude; each of the high frequency input signals (f1, f2) along with a sum (f1+f2) and difference component (f1−f2). Since the frequency of the inputs (f1, f2) and that of the sum (f1+f2) are well above the carrier frequency band of interest, they can be effectively removed with a simple filter. The resultant difference frequency signal is boosted in power level by a low distortion amplifier (within FM transmitter [21]) to a sufficient amplitude level to be received at all locations in the wiring network.

In a practical arrangement, the crystal oscillator produces a signal of 10.7 MHZ in frequency while the synthesizer is set to produce a signal with frequencies such that the frequency difference with the 10.7 MHZ crystal oscillator is in the 50 KHZ to 400 HZ range.

Figure 3:
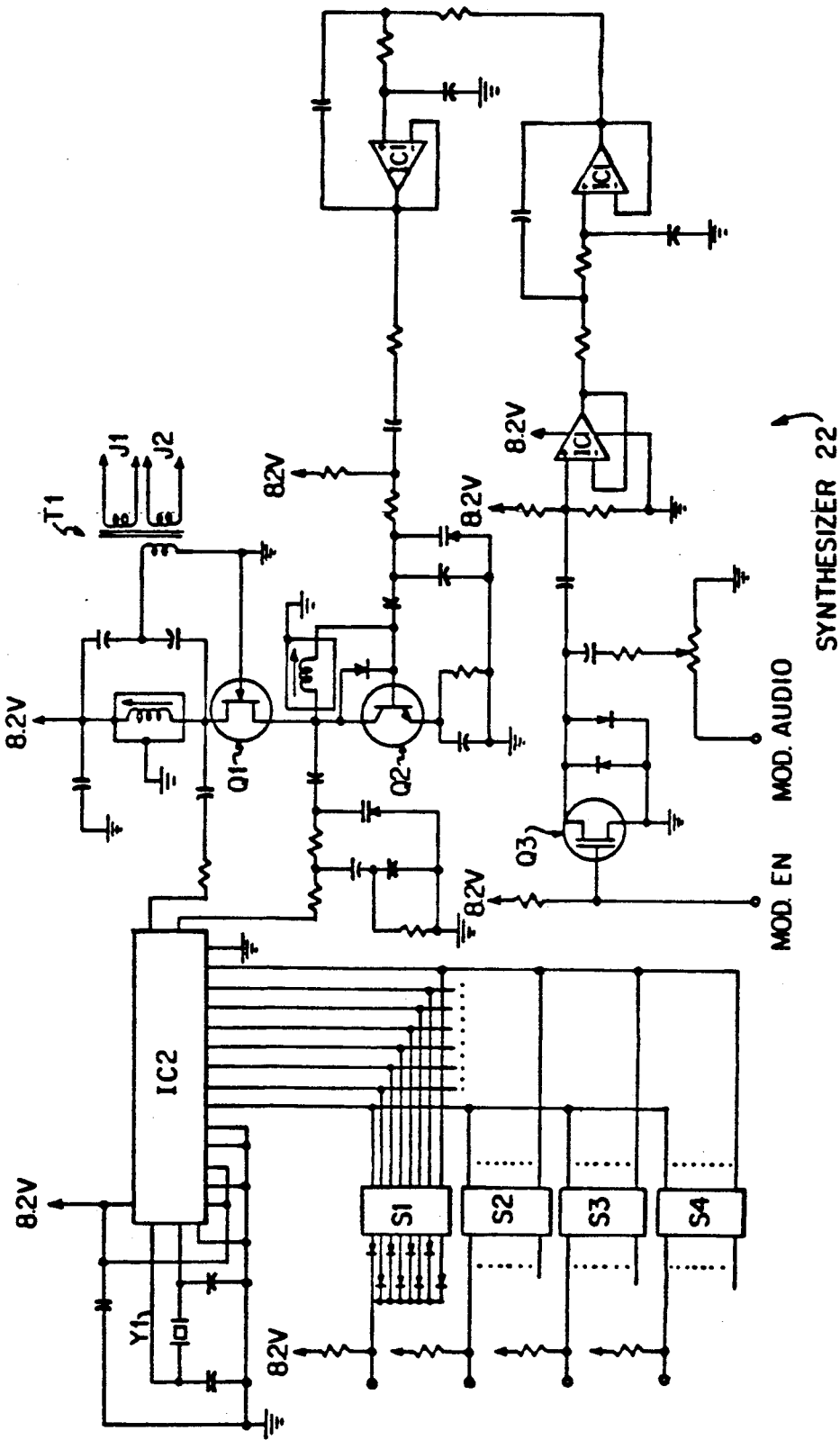
FIG. 3 is a detailed schematic diagram of the digital synthesizer of FIG. 1.

The significant system blocks of FIG. 1 will now be discussed. FIG. 3 illustrates in detail the construction of digital frequency synthesizer (22). The synthesizer is seen to have four control inputs (2, 3, 4, and 5) with which to select the preferred carrier frequency. The selected input will control the synthesized frequency emerging from J1 and J2 of T1 after being processed by integrated circuit phase lock loop frequency synthesizer IC2 (typically a Motorola MC14515-1), transistor Q1 (typically 2N4416) and transistor Q2 (typically 2N918). The frequency synthesizer contains the following major components:

Reference frequency generator consisting of a reference crystal (Y1) an amplifer (embodied within the MC14151 synthesizer chip) and a frequency divider (also within the chip) to provide a reference frequency of 2.00 KHZ.

Voltage controlled oscillator Q2 that receives an adjustment voltage from a frequency/phase comparator (within the MC14151) thereby causing it to oscillate at the prescribed program frequency. This oscillator constitutes a convenient circuit into which the modulation signal can be injected as will be clarified below.

A programmable frequency divider that accepts the VCO input frequency and the eight bit programming number and produces a signal whose frequency and phase are compared to the reference frequency.

A frequency/phase comparator that accepts the reference and feedback frequencies described above and produces a signal whose DC component is proportional to the difference between these two frequencies. Other frequency components (harmonics and mixer products) are also generated by the phase/frequency comparator.

A low pass filter that connects the phase frequency comparator output to the VCO frequency control input. Components within the filter are specifically selected to remove all harmonics and mixer products from the phase frequency comparator output. Additionally the filter is designed to reject voice (baseband) signals hence making it feasible to inject the modulation signal into the VCO and eliminating the need to develop special modulation circuitry in the transmitting section.

The above description is typical of most signal loop synthesizers. The exception being that by giving special attention to the design of the loop filter, the VCO can also serve as the modulator.

Figure 4:
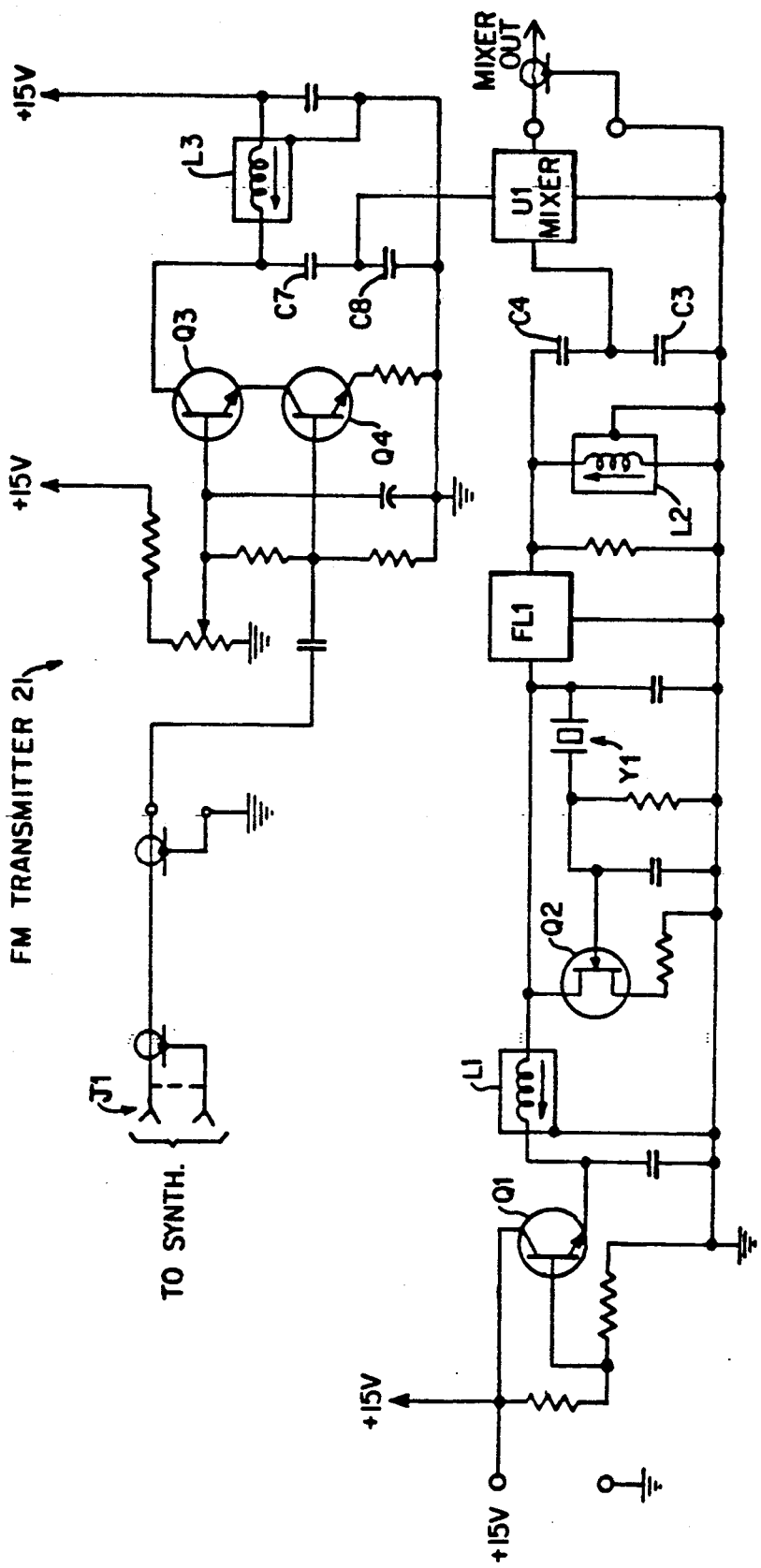
FIG. 4 is a schematic diagram of the crystal oscillator and mixer of the transmitter of the system of FIG. 1.

FM transmitter (21) is depicted in FIGS. 4 and 5. Referring to FIG. 4, the reference crystal oscillator is depicted and is composed principally of transistors Q1 (typically a 2N2222), Q2 (typically a 2N4416) and a 10.7 MHZ crystal Y1. The oscillator signal is filtered in FL1 (typically a 2 pole crystal type filter). Transmitter (21) receives the digitally synthesized signal at J1 which is processed and filtered by transistors Q3, Q4 (typically a 2N918) and filter elements L3, C7 and C8. The reference crystal oscillator signal is filtered by elements L2, C4 and C5. Mixer U1 (typically a Mini-Circuits SRA-3) receives the crystal oscillator and synthesizer signals and will produce the various signals discussed above. The IF output of U1 is directed to the "FROM MIXER" input of FIG. 5. There, the mixer output (the difference frequency signal) is filtered by the network R10, R11, C7, C6 and then amplified by operational amplifiers IC1 and IC2 (typically a Harris HA2559) and IC3 (typically a National Semiconductor LH0063CK). The transmitter output is indicated at C7, C6 and is indicated "TX output".

Figure 6:
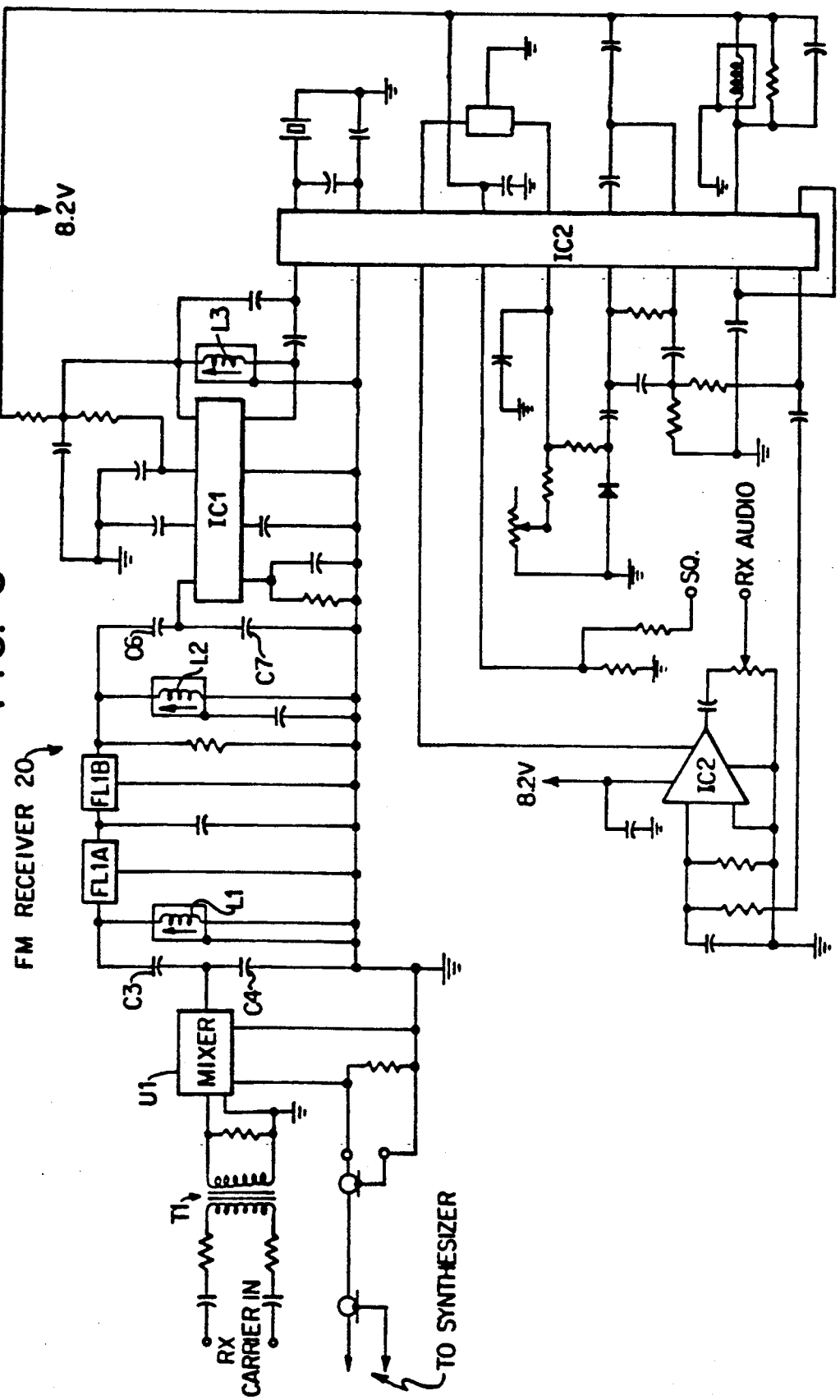
FIG. 6 is a detailed schematic diagram of the FM receiver of FIG. 1.

The FM receiver (20) is indicated in FIG. 6. The received modulated carrier coming from an appropriate page line pair through page/carrier select (17) and carrier RCV/TX select (18) is directed to the "RX car" inputs of the receiver. The modulated signal is supplied to mixer U1 (typically a Mini-Circuits SRA-3) via transformer T1. The carrier signal is directed into the input labeled "to synthesizer" and also to mixer U1. The higher frequency products of the mixer output are filtered by C3, C4, L1, F21A, F21B, L2, C6 and C7. Further filtering, signal processing and amplifying are performed by IF amplifier IC1 (typically Motorola MC1349), narrow band FM IF integrated circuit IC2 (typically a Motorola MC3359) and IC3 audio amplifier (typically a National Semiconductor LM386).

The output of the receiver (20) is the extracted audio signal emerging from "RX audio" in FIG. 6.

Figure 7:
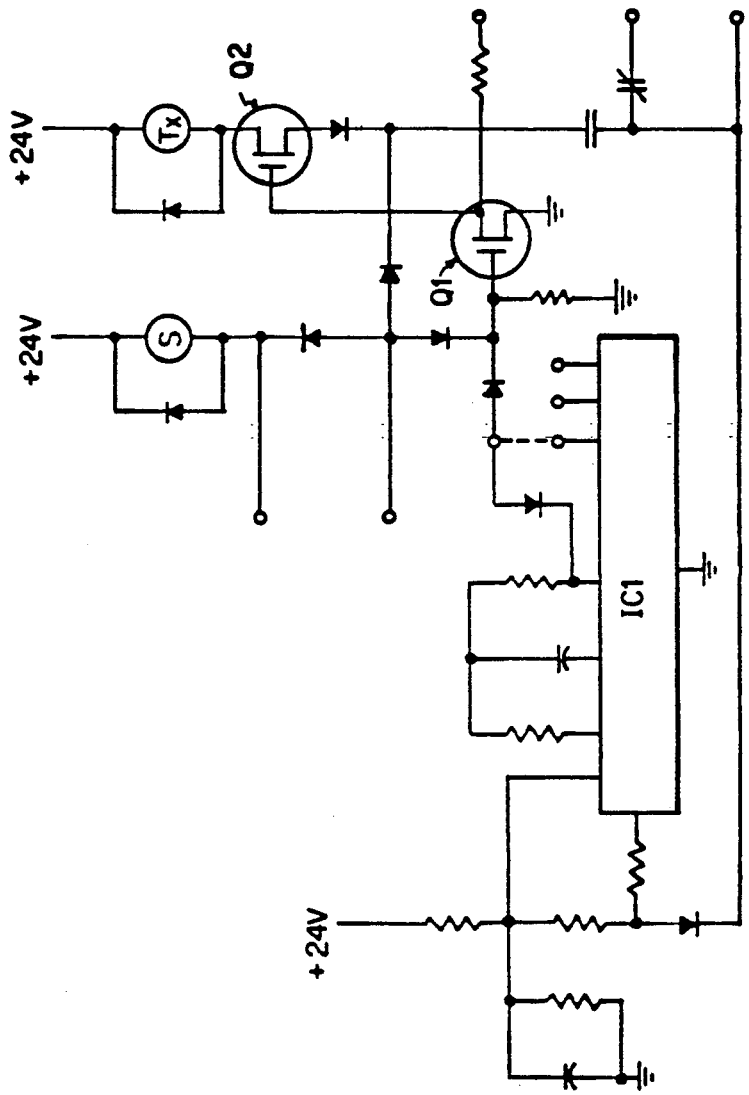
FIG. 7 illustrates schematically the circuitry related to the push to page and push to talk features of the system of FIG. 1.

The "push to talk" turns on the transmitter by way of the "TX control" on FIG. 5. This turns on the power supply regulators to the transmitter circuitry. Circuitry controlling the "push to page"—"push to talk" function is shown in FIG. 7. There, depending on whether the channel select switch is in "page (baseband)" or "carrier" position, a logic signal will enter input 30 and be processed by circuitry including counter/divider and oscillator IC1 (typically an RCA CD4060) and then directed to various blocks which this signal controls (see FIG. 1).

The blocks not shown, page/carrier select (17) and carrier RCV/TX select (18), are merely switching elements, typically relays, to change from one processing function to another. For example, page/carrier select (17) will change the processing function from page to carrier depending on the condition of the channel selector and is also responsive to the push to page signal to permit the page signal to be transmitted. Carrier RCV/TX select (18) will permit either the transmitter circuitry or receiver circuitry to be operative depending on the status of the push-to-talk control.

While the foregoing description and drawings represent the preferred embodiments of the present invention, it will be obvious to those skilled in the art that various changes and modifications may be made therein without departing from the true spirit and scope of the present invention.

What is claimed is:

1. A narrow band FM carrier system where a plurality of carrier signals are used and wherein harmonics of the lower frequency carrier signals are within the frequency range of higher frequency carrier signals so that elimination of disturbing harmonics of said carrier signals by filtering of the carrier signals is not practible and where a carrier signal of low distortion is desired, comprising the combination of
(a) means for producing at least one of said lower-frequency carriers, comprising:
means for generating a first signal having a frequency which is substantially higher than said desired carrier frequency;
means for generating a second signal having a frequency which is substantially higher than said desired carrier frequency and is different from said first frequency;
means for frequency mixing said first and second signals to produce four resulting signals, namely, said first and second signals, a third signal having a frequency which is the sum of the frequencies of the first and second signals and a fourth signal which is the difference between the frequencies of said first and second signals; and
means for removing said first, second and third signals to derive said fourth signal as the desired FM carrier signal, and
(b) modulating means for frequency modulating one of said first or second signals before mixing to provide a modulated carrier output.

2. A system as in claim 1, further including means for suppressing harmonics from said second signal.

3. The system of claim 1 wherein said means for filtering is a simple, non-inductive filter.

4. The system of claim 3 wherein said filter includes only resistive and capacitive elements.

5. The system of claim 1 wherein said means for generating a first signal produces a signal of approximately 10.7 MHz in frequency and wherein said means for generating a second signal is preset to a frequency such that the frequency difference with said first signal is in the 50 KHz to 400 KHz range.

6. A narrow band FM carrier system where a plurality of carrier signals are used and wherein harmonics of the lower frequency carrier signals are within the frequency range of higher frequency carrier signals so that elimination of disturbing harmonics of said carrier signals by filtering of the carrier signals is not practible and where a carrier signal of low distortion is desired, comprising:
means for producing at least one of said lower-frequency carriers, said means comprising:
means for generating a first signal having a frequency which is substantially higher than said desired carrier frequency;
means for generating a second signal having a frequency which is substantially higher than said desired carrier frequency and is different from said first frequency;
means for frequency mixing said first and second signals to produce four resulting signals, namely, said first and second signals, a third signal having a frequency which is the sum of the frequencies of the first and second signals and a fourth signal which is the difference between the frequencies of said first and second signals; and
means for removing said first, second and third signals to derive said fourth signal as the desired FM carrier signal, and
wherein said first signal is generated by a digital frequency synthesizer and said second signal is generated by a reference crystal oscillator.

7. A narrow band FM system having a plurality of modulated carrier signals and wherein harmonics of the lower frequency signals are within the frequency range of higher frequency signals so that elimination of disturbing harmonics of said lower frequency signals by filtering of the signals to eliminate disturbing harmonics is not practible, and where carrier signals of low distortion are desired, comprising:
means for generating a first signal having a frequency which is substantially higher than said desired carrier frequency;
means for generating a second signal having a frequency which is substantially higher than said desired carrier frequency and is different from said first frequency;
a filtering means to remove harmonics from said second signal;
means for frequency mixing said first signal and said filtered second signal, said mixing means providing an output signal comprising four signal components, namely, said first signal, said filtered second signal, a third signal having a frequency which is the sum of the frequencies of said first signal and said filtered second signal, and a fourth signal having a frequency which is the difference between the frequencies of said first signal and said filtered second signal;
an output filtering means for removing said first signal, said filtered second signal and said third signal from said mixer output signal to obtain said fourth signal as the desired FM signal; and
modulating means to frequency modulate said first signal before mixing.

8. The system of claim 7, including a first signal filtering means to suppress harmonics of said first signal before mixing.

9. The system of claim 7, including a first signal filtering means to suppress harmonics from said first signal before mixing.

10. A narrow band FM carrier system having a plurality of carrier signals and wherein harmonics of the lower frequency carrier signals are within the frequency range of higher frequency carrier signals so that elimination of disturbing harmonics of said lower frequencies carrier signals by filtering of the carrier signals to eliminate disturbing harmonics is not practible and where carrier signals of low distortion are desired, comprising:
means for generating a first signal having a frequency which is substantially higher than said desired carrier frequency;
means for generating a second signal having a frequency which is substantially higher than said carrier frequency and is different from said first frequency;
a filtering means to remove harmonics from said second signal;
means for frequency mixing said first signal and said filtered second signal, said mixing means providing an output signal comprising four signal components, namely, said first signal, said filtered second signal, a third signal having a frequency which is the sum of the frequencies of said first signal and said filtered second signal, and a fourth signal having a frequency which is the difference between the frequencies of said first signal and said filtered second signal; and
an output filtering means for removing said first signal, said filtered second signal and said third signal from said mixer output signal to obtain said fourth signal as the desired FM carrier signal; wherein said output filtering means is a simple, non-inductive filter.

11. The system of claim 10, wherein said output filtering means includes only resistive and capacitive elements.

12. A narrow band FM carrier system having a plurality of carrier signals and wherein harmonics of the lower frequency carrier signals are within the frequency range of higher frequency carrier signals so that elimination of disturbing harmonics of said lower frequencies carrier signals by filtering of the carrier signals to eliminate disturbing harmonics is not practible and where carrier signals of low distortion are desired, comprising:

means for generating a first signal having a frequency which is substantially higher than said desired carrier frequency;

means for generating a second signal having a frequency which is substantially higher than said carrier frequency and is different from said first frequency;

a filtering means to remove harmonics from said second signal;

means for frequency mixing said first signal and said filtered second signal, said mixing means providing an output signal comprising four signal components, namely, said first signal, said filtered second signal, a third signal having a frequency which is the sum of the frequencies of said first signal and said filtered second signal, and a fourth signal having a frequency which is the difference between the frequencies of said first signal and said filtered second signal;

an output filtering means for removing said first signal, said filtered second signal and said third signal from said mixer output signal to obtain said fourth signal as the desired FM carrier signal, wherein said first signal generating means is a digital frequency synthesizer and said second signal generating means is a reference crystal oscillator.

13. A narrow band FM carrier system having a plurality of carrier signals and wherein harmonics of the lower frequency carrier signals are within the frequency range of higher frequency carrier signals so that elimination of disturbing harmonics of said lower frequencies carrier signals by filtering of the carrier signals to eliminate disturbing harmonics is not practible and where carrier signals of low distortion are desired, comprising:

means for generating a first signal having a frequency which is substantially higher than said desired carrier frequency;

means for generating a second signal having a frequency which is substantially higher than said carrier frequency and is different from said first frequency;

a filtering means to remove harmonics from said second signal;

means for frequency mixing said first signal and said filtered second signal, said mixing means providing an output signal comprising four signal components, namely, said first signal, said filtered second signal, a third signal having a frequency which is the sum of the frequencies of said first signal and said filtered second signal, and a fourth signal having a frequency which is the difference between the frequencies of said first signal and said filtered second signal;

an output filtering means for removing said first signal, said filtered second signal and said third signal from said mixer output signal to obtain said fourth signal as the desired FM carrier signal, wherein said means for generating said second signal produces a signal of approximately 10.7 MHz in frequency and wherein said means for generating said first signal is preset to a frequency such that its difference from said second signal is in the 50 kHz and 400 kHz range.

14. A method for generating a narrow band FM signal which is free from undesired harmonics, comprising:

generating a first reference signal having a frequency which is substantially higher than the carrier signal;

generating a second reference signal having a frequency which is substantially higher than the carrier signal and is different from said first frequency;

filtering said second reference signal so it is free from harmonics;

mixing said first reference signal and said filtered second reference signal, said mixing resulting in four signals, namely, said first reference signal, said filtered second reference signal, a third signal having a frequency which is the sum of said first reference signal and said filtered second reference signal, and a fourth signal having a frequency which is the difference between said first reference signa and said filtered second reference signal;

filtering out said first, filtered second, and third signals; and frequency modulating one of said first and second signals before mixing.

15. The method of claim 14 including frequency modulating said first reference signal before mixing.

16. A method for generating a narrow band FM carrier signal which is free from harmonics, comprising:

generating a first reference signal having a frequency which is substantially higher than the carrier signal;

generating a second reference signal having a frequency which is substantially higher than the carrier signal and is different from said first frequency;

filtering said first reference signal before mixing so it is free from harmonics.

filtering said second reference signal so it is free from harmonics;

mixing said first reference signal and said filtered second reference signal, said mixing resulting in four signals, namely, said first reference signal, said filtered second reference signal, a third signal having a frequency which is the sum of said first reference signal and said filtered second reference signal, and a fourth signal having a frequency which is the difference between said first reference signal and said filtered second reference signal;

filtering out said first, filtered second, and third signals; and using said fourth signal as the carrier signal.

17. A method for generating a narrow band FM carrier signal which is free from harmonics, comprising:

generating a first reference signal having a frequency which is substantially higher than the carrier signal;

generating a second reference signal having a frequency which is substantially higher than the carrier signal and is different from said first frequency;

filtering said second reference signal so it is free from harmonics;

mixing said first reference signal and said filtered second reference signal, said mixing resulting in four signals, namely, said first reference signal, said filtered second reference signal, a third signal having a frequency which is the sum of said first reference signal and said filtered second reference signal, and a fourth signal having a frequency which is the difference between said first reference signal and said filtered second reference signal;

filtering out said first, filtered second, and third signals; and using said fourth signal as the carrier signal, wherein said filtering of said mixed first, filtered second, and third signals is accomplished by a simple, non-inductive filter.

18. The method of claim 17 wherein said filtering of said mixed first, filtered second, and third signals is accomplished with only resistive and capacitative elements.

19. A method for generating a narrow band FM carrier signal which is free from harmonics, comprising:

generating a first reference signal having a frequency which is substantially higher than the carrier signal;

generating a second reference signal having a frequency which is substantially higher than the carrier signal and is different from said first frequency;

filtering said second reference signal so it is free from harmonics;

mixing said first reference signal and said filtered second reference signal, said mixing resulting in four signals, namely, said first reference signal, said filtered second reference signal, a third signal having a frequency which is the sum of said first reference signal and said filtered second reference signal, and a fourth signal having a frequency which is the difference between said first reference signal and said filtered second reference signal;

filtering out said first, filtered second, and third signals; and using said fourth signal as the carrier signal; wherein said second reference signal has a frequency of approximately 10.7 MHz and said first reference signal is preset to a frequency such that its difference from said second signal is in the 50 kHz and 400 kHz range.

* * * * *